Figure 1:
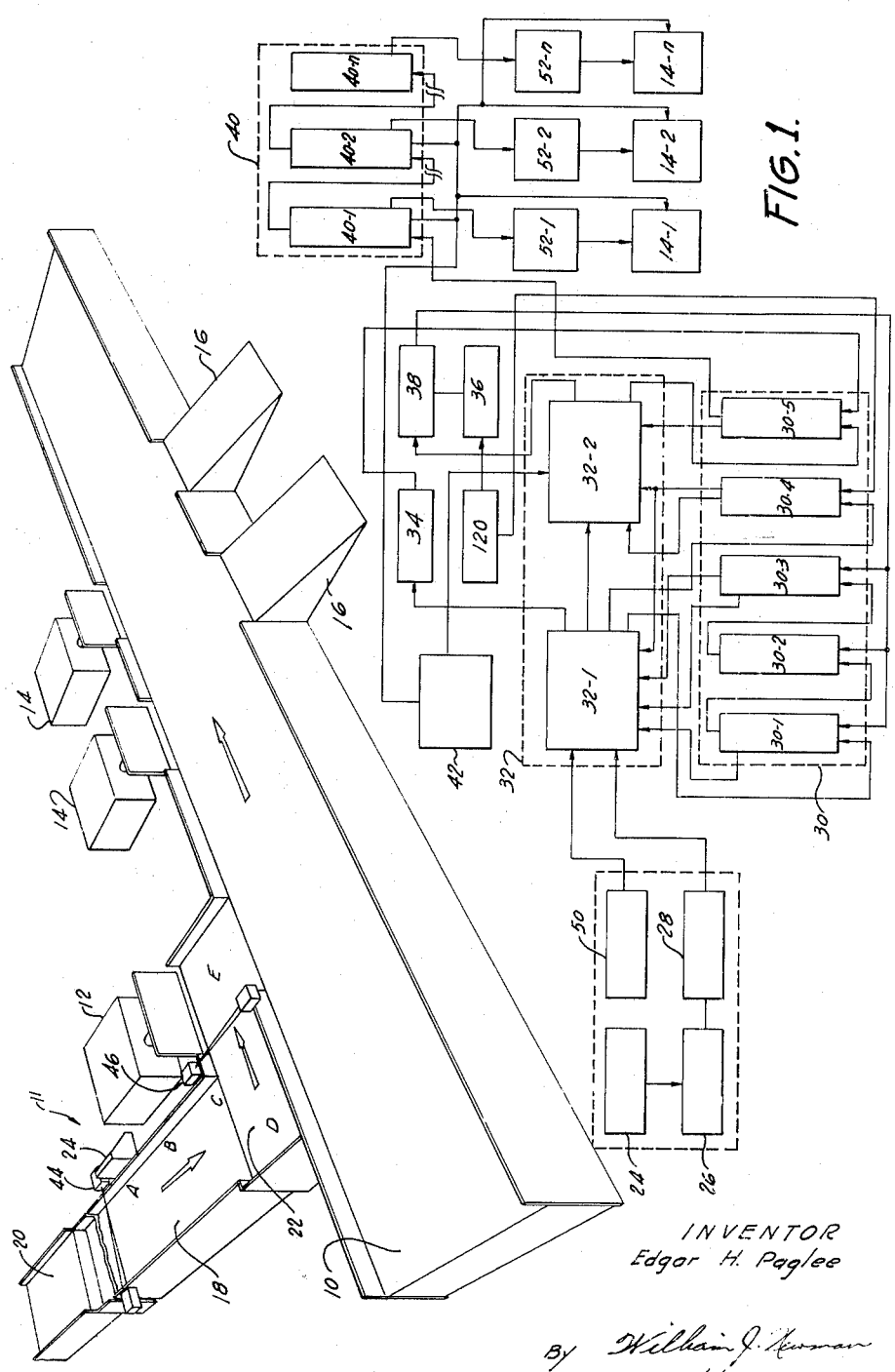

Aug. 3, 1965  E. H. PAGLEE  3,198,351
CONVEYOR SYSTEM
Filed March 12, 1962  4 Sheets-Sheet 1

INVENTOR
Edgar H. Paglee
By William J. Newman
Attorney

INVENTOR
Edgar H. Paglee
By William J. Newman
Attorney

INVENTOR
Edgar N. Paglee 3,198,351
CONVEYOR SYSTEM
Edgar H. Paglee, Chicago, Ill., assignor to Stewart-Warner Corporation, Chicago, Ill., a corporation of Virginia
Filed Mar. 12, 1962, Ser. No. 178,964
7 Claims. (Cl. 214—11)

This invention relates to an improved electronic control system for automatic and semi-automatic transfer of packages to a conveyor.

The preferred embodiment of the present invention has been particularly adapted for use in mail sack sorting systems for use by railways and postoffices and it is particularly advantageous in conveyor systems employing horizontal endless belts. However, the invention is to be limited only to the extent set forth in the claims appended hereto.

In a typical mail sack sorting system for use in a railway depot, the sacks are marked with their geographic destinations. For each depot the United States will be arbitrarily divided into a plurality of major areas each having a main central distribution terminal and a number of nearby areas with branch terminals. For example, for an installation in New York City, Chicago will be a main terminal for midwest mail; and all midwest mail will be directed to Chicago for redistribution. However, each of the several cities along the east coast having direct train service with New York City will have its mail routed directly to it rather than to a central terminal. An address or routing code will be assigned to Chicago for all midwest mail and other codes will be assigned to the east coast cities. The entire country is divided in this manner and each section of the country has an address or routing code.

After the sacks are filled and marked, they must be separated or sorted for loading on trains travelling to the respective terminals. The present invention is primarily directed to this sortation of sacks by code.

Although automatic and semi-automatic conveyor control systems date back as much as a half century, the art is still faced with critical problems especially with regard to flexibility of operation and rapid loading of the belt. For ideal flexibility in the loading operation an operator must be allowed to work at random speeds in preparing the packages and coding address information. Yet the information and packages must be placed onto the sorting portion or the main belt of the system in a synchronous manner. The operator should be given every available opportunity to key and advance packages in a loading area so that a supply of packages is always available to the synchronous portion or main belt of the system.

In the past there have been provided systems in which packages are loaded directly onto the main storage belt and the address codes are read into a temporary storage device as the package proceeds down the belt within the loading area. When the package reaches the end of the loading area, the code information is transferred from the temporary storage device to a synchronous storage device in the form of a shift register so that the package and the code move synchronously towards the sorting stations. An example of this type of system may be seen in the U.S. Patent No. 2,990,965 issued to A. E. Smoll et al., July 4, 1961. However, in that system it may be seen that in the loading area while the address code in the temporary storage system is not synchronized with the movement of the belt, the travel of the packages is synchronized with the main belt because they are actually on the main belt.

Later systems provided separate belts within the loading area on which the packages are prepared for loading onto the main belt. While the packages are on the auxiliary belt, the address code information is read into a temporary storage device and caused to proceed therethrough as the package proceeds along the auxiliary belts until a loading mechanism transfers the package onto the main belt at which time the address code is shifted from the temporary storage device to the synchronous storage device controlling the sorting operation. An example of this type of system may be seen in the presently pending application of Warren E. Graybeal, et al., Serial No. 67,330 filed November 4, 1960 and assigned to the assignee of the present application. It will be seen in the Graybeal conveyor system that the code information is transported through the temporary storage device or buffer memory as an analogue of the travel of the package along the conveyor belts of the loading system until the package arrives adjacent a loading mechanism for placing it on the main belt when a certain sequence of events takes place. In that system, however, the advance of the packages along the auxiliary belts and the advancement of the information code within the buffer memory are actually synchronized with the movement of the main conveyor. The drive mechanism for the main conveyor has coupled thereto a pulse generator and certain of the pulses therefrom are directed to the control circuits for the loading system and to the buffer memory. The information and package are advanced in steps upon receipt of the pulses.

Because the rate of advance of the code and/or the packages in the loading area are prescribed by the main conveyor belt, the speed with which an operator at the loading section is governed by the speed of the main belt. The flexibility of the whole system is, therefore, limited and is especially noticeable in adapting the system for shifting operation between high and low peak periods.

Therefore, it is a primary object of the present invention to provide an improved method and means for loading packages on a conveyor.

Another object of the present invention is the provision of improved circuit means for controlling the loading of packages on the conveyor.

A more specific object of the present invention is the provision of one or more loading stations adjacent the conveyor belt having a load mechanism associated therewith as well as a load belt and storage belt which are controlled automatically or semi-automatically and unsynchronized with the main belt for loading succeeding packages on succeeding portions of the main belt in a rapid and orderly fashion.

Figure 2:
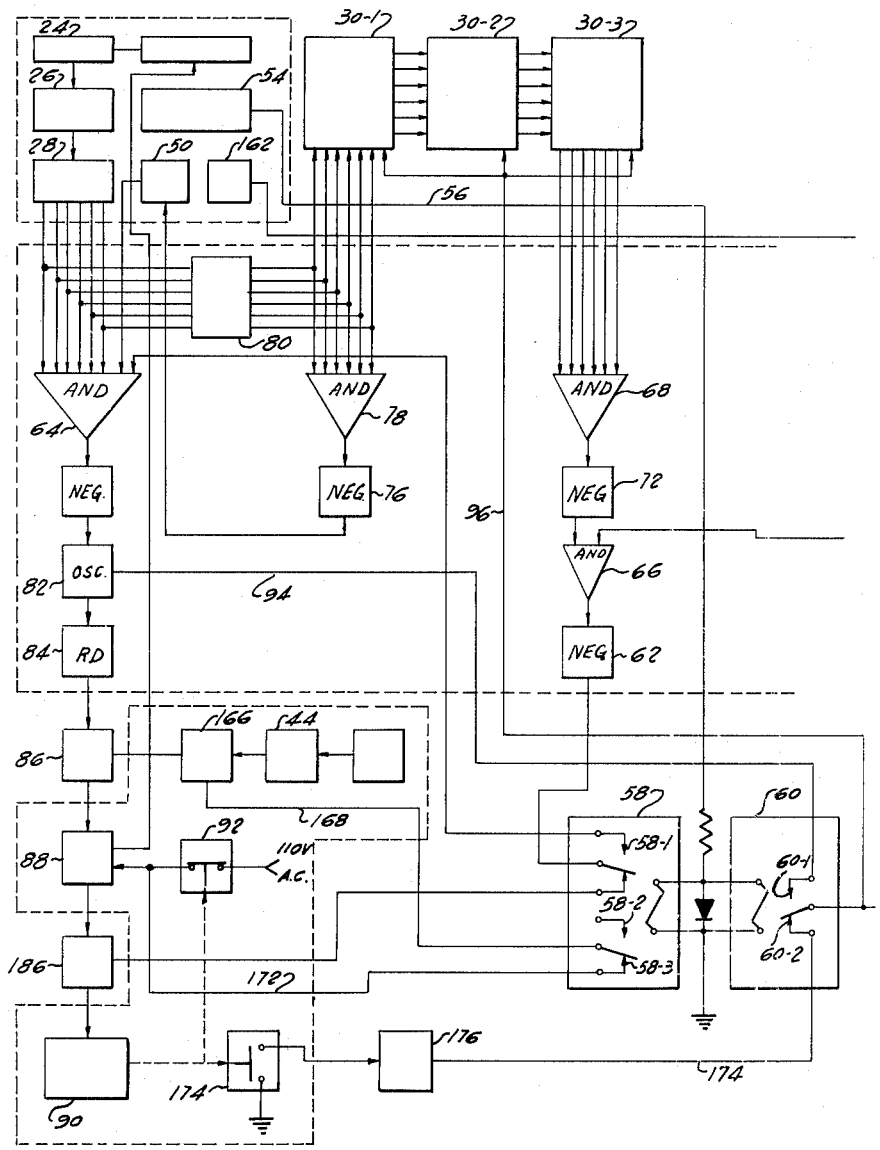
Figure 3:
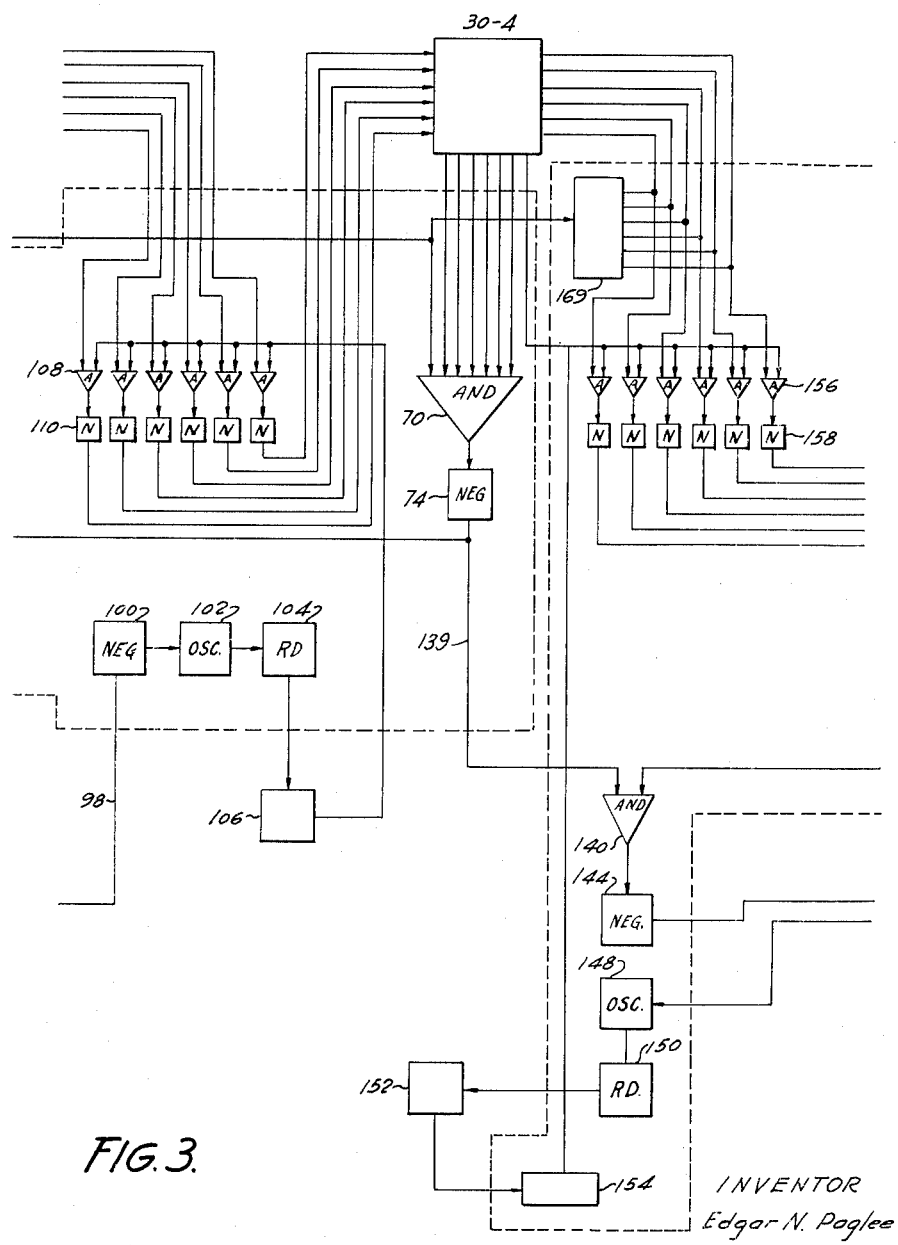
Figure 4:
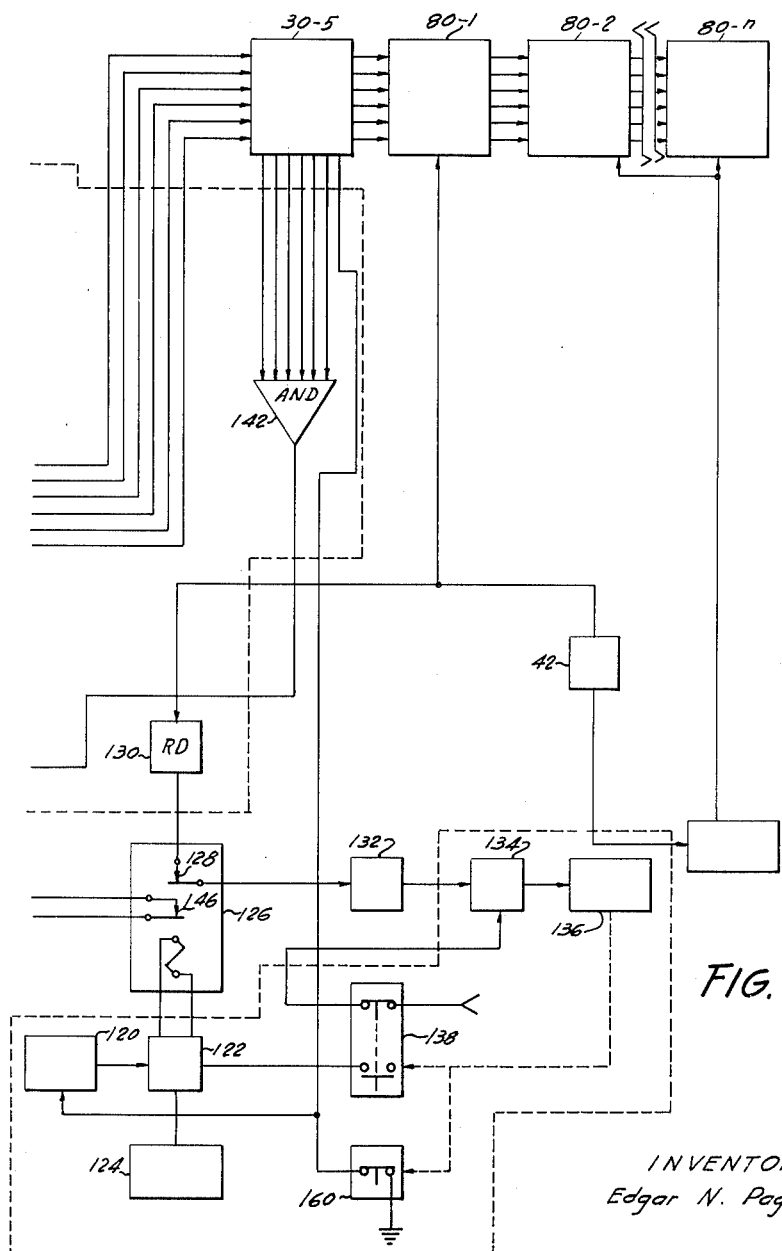

Other objects and advantages of the invention will be evident upon a perusal of the following description taken in conjunction with the accompanying drawings in which:

FIG. 1 is a diagrammatic representation of the improved conveyor and conveyor control system; and FIGS. 2, 3 and 4 are schematic representations of the input logic circuits for controlling the operation of the load belt storage belt and loading mechanism as well as transferring the address information through the buffer memory.

Briefly, the improved conveyor and control system (FIG. 1) comprises an endless main conveyor belt 10 having a loading area at which one or more load stations 11 each having a load mechanism 12 positioned for transferring packages to the belt. A substantially longer unloading area is provided adjacent the belt and is spaced from the loading area in the direction of the belt movement. A plurality of discharge stations having transfer mechanisms 14 are positioned side by side in the unloading area for transferring packages from the belt onto gravity chutes 16 or the like.

A storage belt 18 at the load station 11 is fed by a feeder belt 20 upon which packages from trucks or incoming trains are placed. A load belt 22 is positioned adjacent the storage belt to receive packages from the storage belt 18 and position them before the load mechanism 12. The storage belt 18 carries the packages from the feed belt 20 to the operator position at which is provided keyboard 24 positioned adjacent the storage belt. The keyboard has a plurality of manually operable switches corresponding to the geographic destinations to which the mail sacks or packages are to be directed.

Each keyboard 24 has an associated code board circuit or distribution plug 26 and an entry board circuit 28 which together comprise a code forming unit for establishing binary codes corresponding to the geographic destinations of the packages. The components forming the code forming unit may be the same type described in the previously referenced Graybeal application.

There is a buffer memory unit 30 associated with the load mechanism, the storage belt and the load belt which has as many stations as there are positions available on the belts for simultaneously storing packages. In the preferred embodiment, three packages may be stored on the storage belt 18 at the positions marked A, B and C and two packages may be stored on the load belt 22 at the positions marked D and E. The first buffer stage 30-1 retains the routing code of a package placed on the storage belt by the operator at position A. The second stage 30-2 retains the code after the package has been advanced on the storage belt to the second position B intermediate the operator's position A and the end of the storage belt. The third stage 30-3 retains the code of the package when it is at the position C at the end of the storage belt. The fourth stage 30-4 retains the code after the package has been transferred to the load storage belt at its upstream position D and the last buffer stage 30-5 retains the code after the package has been positioned in front of the load mechanism 12 in preparation for a transfer to the main belt 10.

The code forming unit including the keyboard 24 cooperates with an input logic circuit 32 for controlling the entry of routing information into and through the buffer memory units as well as controlling the operation of the storage and load belts and the load mechanism 12 maintaining the proper synchronization between these operations. The input logic 32 controls both the advancing of the information through the stages in the buffer memory 30 and the physical movement of the storage and load conveyors 18 and 22 respectively through respective control circuits 34 and 36. The input logic also controls the load mechanism 12 through its respective control circuit 38 to transfer the packages from the load belt at position E onto the main belt 10 at which time the address code is placed into the synchronous main memory 40 as hereinafter described.

The operation of the input logic may best be briefly described by a set of Boolean equations. Letters A, B, C, D and E in the equations refer to a package and address code present at that location on the storage or load belt as indicated in FIG. 1. The letters in the equations which have a bar above them (as A bar, B bar, C bar, etc.) indicate not conditions, e.g. no code or package is present at that position. The notations in the equations SB18 and LB22 indicate the storage belt 18 and load belt 22 respectively and the notation LM12 indicates the load mechanism 12. A bar above these notations indicates that they are not operating and the absence of a bar indicates that they are operating. The symbol KE represents the keyboard 24 and the term "clock" represents a pulse from a pulse generator 42 driven synchronously with the main belt 10 which enables the load mechanism 12 to transfer a package from the load belt onto the main belt in synchronism with the main memory control system. the symbol "." indicates "and," that two (or more) conditions must be satisfied simultaneously, and the symbol "+" indicates "or," that either condition will satisfy the situation.

Two modes of operation are possible with this logic, automatic and semi-automatic. The first mode lets the storage belt 18 advance continuously until a package breaks the light of a photoelectric set 44 (P.E.=44 in the equations) which causes the storage belt 18 to stop with the package positioned in front of the operator by keyboard 24. The storage belt is started again by action of the operator depressing a code key. In this mode if there is one package on the storage belt fed thereto by the feeder belt 20, that package would advance to the position A in front of the operator at which the photoelectric set will stop the storage belt. The keying of the address in the keyboard 24 by the operator will again start the storage belt 18 which will continue the package along until it transfers it to the load belt 22 at position D. The load belt 22 is continuously driven until a package breaks the light beam associated with a photoelectric set 46 which in turn operates a centering control circuit 120 to stop the load belt 22 with the package centered in front of the load mechanism 12 at position E. The next synchronizing pulse from the pulse generator will then operate the load mechanism 12 to transfer the package onto the main conveyor.

The semi-automatic operation mode relies on the operator pressing a key in the keyboard 24 each time for the storage belt to advance one position. That is after the operator has written the code for a package at position A into the keyboard 24, the belt will operate to advance the package to position B and the belt will stop. To move that package from B to C another code for the next package must be written into the keyboard 24 or an advance key 50 must be used to advance the storage belt to the next position as will be hereinafter described.

Equations for semi-automatic operation are given as follows, and hold also for automatic operation subject to the conditions outlined in note 1.

(1) $[(KE \cdot A) + \text{Advance}] \cdot \overline{(C \cdot D)} \cdot \overline{(B+B)}$
=SB-18 advance [1], code entered at A initially and codes advance from A to B, B to C, C to D (2) $D \cdot E \cdot \overline{LB-22}$
=LB-22 advance and code advance from D to E; D loses code (3) $\overline{LB-22} \cdot \text{Clock}$
=LM-12 fire, code advance from E to F; E loses code, LB-22 starts [2]

The above equations generally describe the operation of the input logic. A fuller understanding of the input logic operation will be had later with reference to FIGS. 2, 3, and 4 wherein a detailed explanation will be given. It will be noted in FIG. 1 that the input logic 32 is divided into two sections 32-1 and 32-2. The first section 32-1 controls the operation of the storage belt through its control circuit 34 as well as the routing of information through stages 30-1 through 30-3 of the buffer memory 30. The second section of the input logic 32-2 controls the load mechanism through its control circuit 38 as well as the routing of the code information through sections 30-4 and 30-5 as well as transferring the information to the synchronous main memory 40 in a manner to be more fully described.

The main memory unit 80 comprises a multi-stage shift register which is provided with one stage such as 40-1 for each 5 foot section or "zone" along the path of the main belt extending from approximately the first loading mechanism 14 to the last transfer mechanism 14n. The main memory forms an analogue of the main path along which packages are moved by the main conveyor belt 10. As the packages move along the conveyor belt

---

[1] SB-18 advances 2½ feet under semi-automatic operation, but continues to advance under automatic operation, as long as Equation 1 is satisfied and the light beam is not broken by a following package. The information will advance one position for each 2½ feet of SB-18 travel.

[2] After LB-22 is once started, it continues to run until the circuitry associated with photocell set 46 halts it after the light beam is broken.

path, their routing information, shifted from the buffer memory units to the main memory unit, moves through the main memory in synchronism with the movement of the packages along the path.

As the package proceeds along the conveyor belt 10 past each transfer station 14 a decoder unit 52 associated therewith determines if the address pertains to that particular transfer station and if so causes the transfer mechanism 14 to push the package off the belt onto the respective chute 16. If the decoder unit detects that the address is not associated therewith, the package continues along the belt path until it reaches its desired location.

Reference is now made to FIGS. 2, 3 and 4 for a detailed description of the operation of the input logic circuits. The figures should be aligned in sequential order to follow more readily the following description.

Explanation of certain of the symbols used in FIGS. 2, 3 and 4 are in order at this time. The buffer memory stages 30-1 through 30-5 each comprise a bank of six, transistor type flip-flop circuits, each of which can be made to maintain itself in one state or the other depending upon the digits of a binary code which is to be represented. The circuits used in this embodiment are practically identical to those shown for the buffer memory in the copending Graybeal application hereinbefore referenced. For the purposes of this explanation let it be assumed that a high signal input on one of the input leads to the buffer memory stages will put a "1" digit therein and a low input signal will cause it to assume its "0" state.

The "AND" circuits shown may be the ordinary resistor-diode type and they are adapted in this circuitry to indicate an And condition by a high signal at its output when all of the input leads denote a high signal condition. The negator circuits indicated "NEG" are simple grounded emitter transistor circuits for transforming a high input signal to a low output signal and vice versa. The oscillator circuits marked "OSC" are merely one-shot multi-vibrators. The circuits marked "RD" are relay drive circuits which are very similar to the negator circuits in which the following relays are driven by the collector circuit of the grounded emitter transistor. The description of other symbols in the input logic circuit will be described as they appear.

As a convenient starting point assume that the logic is set semi-automatic mode of operation with no information in the buffer memory and the load belt 22 is running. A package is placed at the upstream end of the storage belt 18 by the feeder belt.

To advance the storage belt so that the package may arrive at the keyboard the operator presses the advance key 50. This allows the storage belt 18 to advance 2.5 feet each time the advance button 50 is pressed.

When the operation mode selector button 54 (FIG. 2) is operated to the semi-automatic position, a circuit is completed through lead 56 to energize the windings of relays 58 and 60 pulling their respective armatures to the upper contacts 58-1, 58-2 and 60-1 respectively. The making of contacts 58-1 completes the circuit between negator circuit 62 (FIG. 2) and the eighth input to And circuit 64 (FIG. 2). This circuit with the negator 62 being connected to the output of And circuit 66 tests the third and fourth buffer stages 30-3 and 30-4 for the presence of a code for packages in positions C on the storage belt and D on the load belt. As seen from the Boolean equations a package must not be located in both of these positions at the same time and a low signal at the output of And circuit 66 represents the condition when no code is present in one or the other or both of these stages. Therefore a high output at And circuit 66 indicates that there is a code in both buffer memory stages 30-3 and 30-4 representing packages at positions C and D on the belts. The And circuits 68 and 70 which test buffer memory stages 30-3 and 30-4 for code presence are connected so that their inputs receive a high signal if there is no code in the buffer stage. If no codes are present high signals appear at the outputs of And circuits 68 and 70 which are changed to low signals by negators 72 and 74 respectively. Thus, if there is no code in buffer stages 30-3 and 30-4 the two inputs to And circuit 66 will be low, the output of negator circuit 62 will be high and the eighth input to And circuit 64 will be high being directly connected to the negator circuit 62 through the upper contacts 58-1 of relay 58.

The keyboard circuit distribution plugs 26 and entry board circuit 28 are arranged so that when no code is entered therein the first six inputs to And circuits 64 are high. The operation of the advance key places a high signal to the seventh input of the And circuit 64.

Thus all inputs to And circuit 64 are high which results in a pulse out of oscillator circuit 82 to drive relay drive circuit 84, relay 86 and a latch relay 88. The latch relay closes a circuit to the storage belt motor starter 90 through limit switch 92 until the storage belt moves 2½ feet a which point limit switch 92 is opened. The latch relay 88 thus unlatches and the motor remains off even though the limit switch 92 recloses after the storage belt motor has stopped.

The operator may press the advance key as many times as it is necessary and the storage conveyor 18 will advance 2.5 feet each time. When a package eventually arrives at the keyboard 24 along the storage belt 18, the operator positions it (if this has not already been done) in the center of the 2½ foot zone. The operator next presses the correct key for the proper address. As the key is pressed at least two of the first six inputs to And gate 64 go low, placing the code through the isolation diodes 80 into the buffer memory first stage 30-1. When the key is released a low input is observed by the And circuit 78 connected to the first buffer stage 30-1 and hence the negator circuit 76 tied to the output of the And circuit 78 transmits a high signal through the non-operated advance key 50 to the seventh input to And circuit 64. Since there is still no information in the buffer memory stages 30-3 and 30-4 as represented by a high output of negator 62 and since the release of the key places a high input signal on the first six inputs to And circuit 64, the storage belt 18 will advance as previously described for 2½ feet and stop.

The code information is also shifted from buffer memory stage 30-1 to the second stage 30-2. This is done by transmitting a second pulse output from the oscillator 82 through lead 94, closed contacts 60-1 of relay 60 and lead 96 to the shift pulse inputs of buffer memory stages 30-1 through 30-3. As described in the previous referenced Graybeal application, the code information is transmitted from stage-to-stage by means of shift pulses supplied thereto. It will be noted that the output of oscillator 82 is also transmitted by means of lines 94, contacts 60-1 and line 98 (FIG. 3) to negator 100, oscillator 102, relay drive circuit 104 and relay 106 to cause information to be shifted from the third buffer memory stage 30-3 to the fourth stage 30-4 in a manner that will be hereinafter explained.

Either the advance key 50 or another code key may now be pressed depending upon whether another package has followed the first. The response of the circuitry would be as previously described in either case.

Assume, however, a storage conveyor belt is fully loaded and the code keys have been pressed so that the packages are at positions A, B and C and codes are present in buffer memory stages 30-1, 30-2 and 30-3. Since there is still no information in the fourth stage 30-4, the And circuit 66 will detect the situation to produce a high signal to the eighth input of And circuit 64. The storage belt will again advance after releasing the key for addressing the package at position A and the first package at position C will be dumped onto the load belt 22. At the same time an output will be observed from relay 106 as previously mentioned and the code in buffer memory stage 30–3 will be transferred through And circuits 108 and negator circuits 110 to the input of buffer memory stage 30–4 in the following manner.

One of the inputs of each of the And circuits 108 is connected to one of the outputs of the flip-flop circuits forming the memory stage 30–3. Thus, certain of the outputs of 30–3 will have a high signal representative of the code. When a pulse is produced by the relay 106 and transmitted to the other inputs of the And circuits 108, those And circuits which have a corresponding high signal from the memory stage 30–3 will present high signals to their respective negators 110. The low outputs of the negators 110 will trigger the appropriate flip-flop circuits in the buffer memory stage 30–4 to represent the proper code.

Provisions are made to insure that the code is read into stage 30–4 before it is erased from the previous memory stage 30–3. This is done by causing the codes to shift in stages 30–1 through 30–3 on the trailing edge of the pulse supplied by the oscillator 82. This can be a rather long pulse, for example approximately 80 milliseconds. The oscillator 102, however, is caused to begin its pulse on the leading edge of the output of oscillator 82 and it is designed to produce a substantially shorter pulse, say about 40 milliseconds. The information is, therefore, shifted through the And circuits 108 and negator circuits 110 to buffer memory 30–4 substantially before the trailing edge of the shift pulse shifts the information through the buffer memory stages 30–1 through 30–3. This method of code shifting is termed the "negator" method.

The use of the negating type of code transfer from memory stages 30–3 to 30–4 through the And circuits 104 and negator circuits 110 is employed so that a code may be shifted from the fourth memory stage 30–4 to the fifth memory stage 30–5 without affecting codes in the first three levels 30–1 through 30–3. This enables the load belt 22 to advance a package from position D to position E without waiting for the storage belt 18.

The mechanical operation of the load belt 22 is closely related to the logic circuits which control buffer memory stages 3 and 4. The belt runs continuously at a specified velocity until a package interrupts the light beam from the photocell set 46. The photocell 46 triggers the parcel centering control 120 so that the load belt 22 will stop when the package is centered in front of the loading mechanism 24. The centering control may be of the type shown in the copending application of Gilbert Anderson filed December 16, 1960, Serial No. 76,376.

The parcel centering control 120 stops the operation of the load belt 22 by releasing the latch relay 122 (FIG. 4), which turns off load belt motor starter 124. The release of latch relay 122 also deenergizes a relay 126 to prepare a circuit for operating the load mechanism 24 through the normally closed contact 128. Thus, when a pulse is received from the clock pulse generator 42 (FIG. 4) which as indicated previously is synchronized to the travel of the main sortation belt 10, a pulse is transmitted therefrom through relay drive 130, contacts 128 to relay 132. The operation of relay 132 pulls in the latch relay 134 to energize the load mechanism motor 136 and cause the load mechanism 12 to push the package off the load belt 22 onto the main conveyor 10. When the load mechanism returns to its retracted position, it operates limit switch 138 which pulls in latch relay 122 and starts the load belt motor through its starter circuit 124.

Returning to follow the action of the code in buffer memory 30–4 (FIG. 3), it will be recalled that as a package was placed on the load belt at position D by the storage belt 18 the destination code was read into stage 30–4 as previously described. As soon as the load belt 22 stopped, that package is ready to be loaded onto the main conveyor.

As previously discussed, the combination of And circuit 70 and negator circuit 74 detects the presence of a code in stage 30–4. The output of negator 74 presents a high signal through conductor 139 to one input of And circuit 140 when there is a code present in the fourth stage 30–4. And gate 142 (FIG. 2) detects the non-presence of a code in the fifth buffer memory stage 30–5 related to position E and presents a high signal from its output to the other input of And gate 140. The output from 140 is made low in negator 144 and transmitted through normally closed contacts 146 of the deenergized relay 126 to fire a one-shot oscillator 148. The output pulse from the oscillator 148 drives relay drive 150 which in turn drives relay 152. The relay 152 in turn shifts the code in the fourth memory stage 30–4 into the fifth stage 30–5 by means of the negating method employing And circuits 156 and negators 158 as previously described for transferring the code from stage 30–3 to 30–4.

The code is now ready to be transferred to the main memory 80 as soon as the clock pulse from the generator 42 operates the load mechanism 136. This is done by limit switch 160 which is mechanically coupled to the loading mechanism 12 and as the mechanism completes its cycle, the switch 160 opens a ground to the buffer memory stage 30–5 to shift the code to the main memory, erase the code in the buffer memory stage 30–5 and set the logic up to receive the following parcel.

An erase switch 162 is provided adjacent the keyboard 24 in case the keyboard operator may press the wrong key for a particular parcel. If he holds the parcel back and keys again after the storage belt 18 has stopped, the wrong code will eventually arrive at buffer memory stage 30–4 with no package present at that position. The logic will then be locked out because there will be no package to trip the photocell set 46 to cause the relay 126 to drop out and complete the circuit for the continuation of the logic through the contacts 128 and 146. The erase switch is therefore used to cause erase diodes 164 to remove the code from the logic at the buffer memory stage 30–4 in a well known manner.

The remaining mode of operation of the conveyor loading system is automatic. For this method of parcel handling relays 58 and 60 are deenergized. This disables the code shifting function of oscillator 82 and places a 110 volt A.C. signal from contacts within the photocell latch relay 166 (FIG. 2) through lead 168, normally closed contacts 58–3 of relay 58 and lead 172 to the storage belt motor latch relay 88. Once the storage belt 18 is started by either the advance switch 50 or by entering the code in the keyboard 24 as previously described, it will continue to run until the photocell latch relay 166 is unlatched by a package breaking the beam for the photocell set 44 at the operator position along the storage belt 18. It will be noted that after the photocell latch relay 166 is unlatched, the storage belt will continue to advance until the limit switch 92 is opened. This will insure that the storage belt will always stop on a 2½ foot zone. The position of the parcel may then be adjusted for proper loading onto the load belt 22. The advancing of the information is accomplished by a limit switch 174 so that each time the storage belt 18 advances 2½ feet, any information in the buffer memory stages 30–1 through 30–3 will advance one position by means of pulse signals from ground through the limit switch 174, relay 176, line 178, normally closed contacts 60–2 of relay 60 and line 96 to each of the buffer memory stages 30–1 through 30–3. When the storage belt is stopped with a package positioned at the operator station, the photocell latch relay 166 has unlatched. This relay is again latched up by means of a pulse from the output of oscillator 82 when the address is written into the keyboard 24 in a manner substantially the same as described for semi-automatic operation.

A relay 186 is provided in the energization circuit for the storage belt motor start 90 to prevent double loading of parcels on the load belt 22. If information appears simultaneously in buffer memory stages 30–3 and 30–4 indicating that parcels are present at position C on the storage belt and position D on the load belt, the negated output from And circuit 66 causes the relay 186 to disable the storage belt until the code and the parcel are advanced out of the buffer memory stage 30-4 and position D at the upstream end of the load belt 22.

In summary this logic design allows the operator to take advantage of every opportunity to enter packages into the system. It can be operated at a continuous rate of for example 25 parcels per minute. Address information can be stored for up to five different parcels at once and the operator is free to key in any situation that will not cause a jam. He may also key and advance packages even while a package is waiting to be loaded at posiiton E. The conveyor arrangement provides a method of material handling requiring a least amount of physical effort and the completely non-synchronous logic controls their operation in the most efficient manner. While there has been shown one embodiment of the present invention, it is recognized that there may be made many modifications and/or improvements thereto. It is, therefore, intended that the invention be limited only by the scope of the appended claims.

What is claimed is:

1. In a conveyor system of the type in which a main belt transports packages loaded thereon toward discharge stations along its path, in which transfer mechanisms are provided at the stations for removing packages from the main belt, and in which an electrical control system having a manully operated keyboard producing coded routing information for each package loaded on the belt is controlled by the information to selectively operate the transfer mechanisms for removing the packages at selected discharge stations, in combination therewith a package load mechanism adjacent the main belt path, a storage belt on which packages are loaded, a load belt, a buffer memory interposed between the keyboard and the control system receiving and storing routing information for each package incident to the operation of the keyboard, means for normally maintaining the load belt in operation, means operable responsive to the presence of a package on said moving load belt for stopping said load belt when said package is adjacent the load mechanism, means for moving the storage belt in steps to advance the packages to said load belt, means advancing the routing information in the buffer memory coincident with the movement of the packages on the storage and load belts, and circuit means initiating the operation of the load mechanism and transferring routing information of transfer packages from the buffer memory to the control system.

2. In a conveyor system of the type in which a main belt transports packages loaded thereon toward discharge stations along its path in which transfer mechanisms are provided at the stations for removing packages from the main belt, and in which an electrical control system having a manually operated keyboard producing coded routing information for each package loaded on the belt is controlled by the information to selectively operate the transfer mechanisms for removing the packages at selected discharge stations, in combination therewith a package load mechanism adjacent the main belt path, a storage belt on which packages are loaded, a load belt, a buffer memory interposed between the keyboard and the control system receiving and storing routing information for each package incident to the operation of the keyboard, means for normally maintaining the load belt in operation, means operable responsive to the presence of a package on said moving load belt for stopping said load belt when said package is adjacent the load mechanism, means responsive to said keyboard for controlling the storage belt to advance the packages to said load belt, means advancing the routing information in the buffer memory coincident with the movement of the packages on the storage and load belts, and circuit means initiating the operation of the load mechanism and transferring routing information of transfer packages from the buffer memory to the control system.

3. A package loading system for a conveyor system of the type in which a main belt transports packages loaded thereon toward discharge stations along its path in which transfer mechanisms are provided at the stations for removing packages from the main belt, and in which an electrical control system having a manually operated keyboard producing coded routing information for each package loaded on the belt is controlled by the information to selectively operate the transfer mechanisms for removing the packages at selected discharge stations, said loading system comprising a package load mechanism adjacent the belt path, a storage belt on which packages are loaded, a load belt, a buffer memory interposed between the keyboard and the control system receiving and storing routing information for each package incident to the operation of the keyboard, means for normally maintaining the load belt in operation, means operable responsive to the presence of a package on said moving load belt for stopping said load belt when said package is adjacent the load mechanism, means for moving the storage belt in steps to advance the packages to said load belt, means advancing the routing information in the buffer memory coincident with the movement of the packages on the storage and load belts, and circuit means initiating the operation of the load mechanism and transferring routing information of transfer packages from the buffer memory to the control system.

4. A package loading system for a conveyor system of the type in which a main belt transports packages loaded thereon toward discharge stations along its path in which transfer mechanisms are provided at the stations for removing packages from the main belt, and in which an electrical control system having a manually operated keyboard producing coded routing information for each package loaded on the main belt is controlled by the information to selectively operate the transfer mechanisms for removing the packages at selected discharge stations, said loading mechanism comprising a package load mechanism adjacent the belt path, a storage belt on which packages are loaded, a load belt, a buffer memory interposed between the keyboard and the control system receiving and storing routing information for each package incident to the operation of the keyboard, means for normally maintaining the load belt in operation, means operable responsive to the presence of a package on said moving load belt for stopping said load belt when said package is adjacent the load mechanism, means responsive to said keyboard for controlling the storage belt in steps to advance the packages to said load belt, means advancing the routing information in the buffer memory coincident with the movement of the packages on the storage and load belts, and circuit means initiating the operation of the load mechanism and transferring routing information of transfer packages from the buffer memory to the control system.

5. In apparatus of the type in which a conveyor system is operated by an electrical timing means for automatic removal of the selected discharge stations of packages placed on the conveyor, in combination therewith a power operated load mechanism, a power operated storage belt upon which packages are placed, a normally operating load belt for receiving packages from the storage belt and positioning the packages for transfer to the conveyor by the load mechanism, additional timing means periodically operating the load mechanism to transfer packages from the load belt to the conveyor, means including a code addresser for automatically advancing the storage belt to transfer packages to the load belt, and circuit means operative responsive to each package on the load belt for stopping said load belt with the package positioned adjacent the load mechanism.

6. In apparatus of the type in which a conveyor system is operated by an electrical timing means for automatic removal of the selected discharge stations of packages placed on the conveyor, in combination therewith a power operated load mechanism, a power operated storage belt upon which packages are placed, a normally operating load belt for receiving packages from the storage belt and positioning the packages for transfer to the conveyor by the load mechanism, additional timing means periodically operating the load mechanism to transfer packages from the load belt to the conveyor, means including a code addresser for advancing the storage belt in steps to transfer packages to the load belt, and circuit means operative responsive to each package on the load belt for stopping said load belt with the package positioned adjacent the load mechanism.

7. A package loading system for a conveyor system of the type in which a main belt transports packages loaded thereon toward discharge stations along its path in which transfer mechanisms are provided at the stations for removing packages from the main belt, and in which an electrical control system having a manually operated keyboard producing coded routing information for each package loaded on the belt is controlled by the information to selectively operate the transfer mechanisms for removing the packages at selected discharge stations, said package loading system comprising a package load mechanism adjacent the belt path, a load belt, a storage belt for loading packages onto said load belt, a buffer memory interposed between said keyboard and said control system receiving and storing routing information for each package incident to the operation of said keyboard, means for normally maintaining the load belt in operation, means operable responsive to the presence of a package on said moving load belt for stopping said load belt when said package is adjacent the load mechanism, means operable responsive to said keyboard for controlling said storage belt to deliver packages to said load belt, means advancing the routing information in the buffer memory coincident with the movement of the packages on the storage and load belts, and circuit means initiating the operation of the load mechanism and transferring routing information of packages from the buffer memory to the control system.

References Cited by the Examiner

UNITED STATES PATENTS

| | | | |
|---|---|---|---|
| 2,990,965 | 7/61 | Smoll | 214—11 |
| 2,998,889 | 9/61 | Swansen | 214—11 |
| 3,000,519 | 9/61 | Purnell | 214—11 |
| 3,105,601 | 10/63 | Smoll | 214—11 |

FOREIGN PATENTS 632,403   11/49   Great Britain.

HUGO O. SCHULZ, *Primary Examiner.*

MORRIS TEMIN, *Examiner.*